3,277,174
4,4'-BIS(ALKYLAMINO)-N-ALKYL-, CYCLO-ALKYL-
OR -AROMATIC-DIPHENYLAMINES
Edward L. Wheeler, Woodbury, Conn., assignor to United
States Rubber Company, New York, N.Y., a corporation of New Jersey
No Drawing. Filed Sept. 25, 1963, Ser. No. 311,342
3 Claims. (Cl. 260—576)

This invention relates to new chemicals which are antiozonants for rubber and to their use in inhibiting the deteriorating effect of ozone on rubber.

It is known that ozone causes surface cracking of conventional rubber vulcanizates when the rubber is under strain. The most severe deterioration occurs when a small number of cracks are formed which grow rapidly at the expense of the formation of new cracks. Such a condition will produce deep, disruptive fissures which seriously shorten the serviceable life of the article. Waxes have been utilized to inhibit ozone cracking in articles under static stress by milling them into the rubber stock before vulcanization; the wax migrates to the surface of the rubber article to form a film which acts as a physical barrier to ozone attack. However, if the article is subjected to dynamic flexing during service the wax film breaks and the article cracks worse than if no wax had been incorporated.

Chemical antiozonants have been developed which retard the formation of ozone cracks during both static and dynamic conditions. Examples of antiozonants now being used are N-isopropyl-N'-phenyl-p-phenylenediamine, N-cyclohexyl-N'-phenyl-p-phenylenediamine, N,N'-dioctyl-p-phenylenediamine, 6-ethoxy-1,2-dihydro-2,2,4-trimethylquinoline and nickel dibutyldithiocarbamate.

I have discovered a new class of organic compounds, which are antiozonants for rubber. The compounds have the general formula

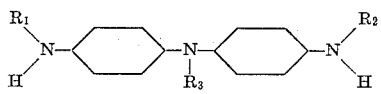

in which $R_1$ and $R_2$ are the same and are selected from the group consisting of alkyl radicals having 1 to 8 carbon atoms and cycloalkyl radicals having 5 to 8 carbon atoms, and $R_3$ is selected from the group consisting of alkyl radicals having 1 to 4 carbon atoms and phenyl and alkyl mono substituted phenyl radicals in which the alkyl substituent has 1 to 4 carbon atoms. The chemicals of the present invention are also antioxidants for rubber. The chemicals of the present invention are used as antiozonants and antioxidants for rubber in amounts from 0.1 to 5 parts by weight per 100 parts of rubber.

The 4,4'-bis(sec.-alkylamino)-N-substituted diphenylamines and the 4,4'-bis(cycloalkylamino)-N-substituted diphenylamines of the above general formula are prepared by reductively alkylating the selected 4,4'-diamino-N-substituted diphenylamine or the selected 4,4'-dinitro-N-substituted diphenylamine having the desired $R_3$ radical in the above general formula as the substituent with the selected ketone in the presence of hydrogen using a hydrogenation catalyst such as palladium-on-charcoal. The 4,4'-bis(primary alkylamino)-N-substituted diphenylamines are prepared by diacylation of the selected 4,4'-diamino-N-substituted diphenylamine as by the reaction with an amide, ester, chloride, or anhydride of the selected alkanoic acid followed by reduction of the acyl groups to primary alkyl groups as with lithium aluminum hydride. The 4,4'-diamino-N-substituted diphenylamines are prepared in known manner by reducing the corresponding 4,4'-dinitro-N-substituted diphenylamines by hydrogenation in the presence of a suitable catalyst such as nickel, copper chromite, platinum, rhodium or palladium.

Examples of the chemicals of the present invention are:

4,4'-bis(sec.-butylamino)-N-methyldiphenylamine
4,4'-bis(1,3-dimethylbutylamino)-N-methyldiphenylamine
4,4'-bis(n-butylamino)-N-methyldiphenylamine
4,4'-bis(methylamino)triphenylamine
4,4'-bis(ethylamino)triphenylamine
4,4'-bis(isopropylamino)triphenylamine
4,4'-bis(cyclohexylamino)triphenylamine
4,4'-bis(2-octylamino)triphenylamine
4,4'-bis(n-propylamino)triphenylamine
4,4'-bis(isopropylamino)-N-methyldiphenylamine
4,4'-bis(n-octyl)-N-methyldiphenylamine
4,4'-bis(isopropylamino)-N-ethyldiphenylamine
4,4'-bis(isopropylamino)-N-p-tolyldiphenylamine
4,4'-bis(2-octylamino)-N-methyldiphenylamine
4,4'-bis(methylamino)-N-methyldiphenylamine
4,4'-bis(cyclohexylamino)-N-methyldiphenylamine Examples 1 to 8 illustrate the preparation of the chemicals of the present invention.

EXAMPLE 1

*4,4'-bis(isopropylamino)-N-methyldiphenylamine*

Into a 1.7-liter rocking autoclave were charged 115 grams of 4,4'-diamino-N-methyldiphenylamine, 500 ml. of acetone, and 3.1 grams of 5% palladium-on-carbon. The contents while agitated were subjected to 300–540 p.s.i. gauge pressure of hydrogen at 150–155° C. for 3 hours. After cooling, the hydrogenated charge was removed and the catalyst separated by filtration. The acetone was removed by distillation and the residue product was purified by vacuum distillation. A forerun of 11 grams were obtained: B.P. 170–187° C. (0.4 mm.). The 4,4'-bis(isopropylamino)-N-methyldiphenylamine, B.P. 187–193° C. (0.4 mm.), weighed 113.5 g. (71% yield).

*Analysis.*—Calculated for $C_{19}H_{27}N_3$: C, 76.7; H, 9.15; N, 14.1. Found: C, 76.4; H, 9.13; N, 14.0. If desired, the 4,4'-dinitro-N-methyldiphenylamine may be reductively alkylated with acetone in a similar manner to the 4,4'-diamino-N-methyldiphenylamine to give the 4,4'-bis(isopropylamino)-N-methyldiphenylamine.

The 4,4'-dinitro-N-methyldiphenylamine was prepared as follows: Into a 500 ml. 3-neck flask equipped with a thermometer, stirrer, and a Stark and Dean trap filled with benzene, were charged 72 g. of p-nitro-N-methylaniline, 78 g. of p-nitrochlorobenzene, 69 g. of potassium carbonate, and 70 ml. of dimethylformamide. The mixture was heated at 160–170° C. for 29 hours with continuous removal of the water formed. The mixture was cooled, quenched with water, and the resulting precipitate filtered. The precipitate was digested with dilute hydrochloric acid on the steam bath, then after filtering, was treated with hot ethanol. The alcohol insoluble material was filtered. This product was then dissolved in chloroform and filtered. The product was recovered by evaporation of the chloroform to yield 110 g. (86% yield) of 4,4'-dinitro-N-methyldiphenylamine, M.P. 174–176° C. The product melted at 178–179° C. after recrystallization from aqueous dimethylformamide [see J. Am. Chem. Soc. 74, 1321 (1952)].

The 4,4'-diamino-N-methyldiphenylamine was prepared by reducing the 4,4'-dinitro-N-methyldiphenylamine by hydrogenation in isopropanol at 100° C. and 200–400 p.s.i. gauge pressure of hydrogen in the presence of a palladium-on-charcoal catalyst. The 4,4'-diamino-N-methyldiphenylamine was isolated by removing the catalyst by filtration and evaporating the solvent. The chemical melted at 172.5–174° C. after recrystallization from an ethanol-water mixture.

EXAMPLE 2

*4,4'-bis(isopropylamino)-N-ethyldiphenylamine*

Into a 1-liter rocking autoclave were charged 26 grams of 4,4'-diamino-N-ethyldiphenylamine, 150 ml. of acetone and 0.9 grams of 5% palladium-on-charcoal. The mixture while agitated was subjected to 400–500 p.s.i. gauge pressure of hydrogen at 50–110° C. for 0.5 hour. The catalyst was separated from the cooled reaction mixture by filtration, the acetone removed by distillation, and the residue product purified by vacuum distillation. The fraction boiling at 187° C. (0.1 mm.) weighed 17 grams (47% yield) and was the desired 4,4'-bis(isopropylamino)-N-ethyldiphenylamine.

*Analysis.*—Calculated for $C_{20}H_{29}N_3$: C, 77.1; H, 9.38; N, 13.49. Found: C, 77.2; H, 9.22; N, 13.78.

The 4,4'-dinitro-N-ethyldiphenylamine may be prepared by the procedure of Example 1 in 32% yield, however, the preferred method is as follows: To a mixture of 52 g. of 4,4'-dinitrodiphenylamine (Beil. XII, 716), 500 ml. of acetone and 200 g. of anhydrous potassium carbonate was added 92 g. of diethyl sulfate. The mixture was heated under reflux for 4 hours, an additional 25 ml. of diethyl sulfate was added, and the mixture heated under reflux for 20 hours. The reaction mixture was poured into 2 liters of cold water, and the resulting precipitate filtered and washed with warm water. 54 g. (92% yield) of 4,4'-dinitro-N-ethyldiphenylamine was obtained, M.P. 144–145° C.

The 4,4'-diamino-N-ethyldiphenylamine was prepared by reducing the 4,4'-dinitro-N-ethyldiphenylamine by hydrogenation in isopropanol at 100° C. and 200–400 p.s.i. gauge pressure of hydrogen in the presence of a palladium-on-charcoal catalyst. The 4,4'-diamino-N-ethyldiphenylamine was isolated by removing the catalyst by filtration and evaporating the solvent. The chemical melted at 113–115° C. after recrystallization from an ethanol-water mixture.

EXAMPLE 3

*4,4'-bis(isopropylamino)-N-p-tolyldiphenylamine*

Into a 1.7 liter rocking autoclave were charged 51 grams of 4,4'-diamino-N-p-tolyldiphenylamine, 400 ml. of acetone, and 1.3 grams of 5% palladium-on-charcoal. The contents while agitated, were subjected to 600 p.s.i. gauge pressure of hydrogen at 150–160° C. for 5 hours. The catalyst was removed by filtration, and the product was isolated by pouring the reaction mixture into water and filtering off the resulting precipitate. After recrystallization from hexane the 4,4'-bis(isopropylamino)-N-p-tolyldiphenylamine, 48 grams (72% yield), melted at 130–133° C.

*Analysis.*—Calculated for $C_{25}H_{31}N_3$: C, 80.4; H, 8.36; N, 11.24. Found: C, 80.7; H, 7.91; N, 11.69.

The 4,4'-dinitro-N-p-tolyldiphenylamine was prepared as follows: Into a 500 ml. three-neck flask equipped with thermometer, stirrer, and a Stark and Dean trap filled with benzene, were charged 44 g. of N-formyl-p-toluidine, 110 g. of p-nitrochlorobenzene, 65 g. of anhydrous potassium carbonate, and 50 ml. of dimethylformamide. The reaction mixture was heated at 160–170° C. for 19 hours, with continuous removal of the water formed. The mixture was cooled, quenched with water, and the resulting precipitate filtered. The precipitate was digested with dilute aqueous hydrochloric acid, then filtered and washed with hot water, then dried. 104 g. (91.5% yield) of 4,4'-dinitro-N-p-tolyldimethylamine was obtained, M.P. 235–242° C. The product after recrystallization from benzene melted at 244–246° C.

The 4,4'-diamino-N-p-tolyldiphenylamine was prepared by reducing the 4,4'-dinitro-N-p-tolyldiphenylamine by hydrogenation in isopropanol at 100° C. and 200–400 p.s.i. gauge pressure of hydrogen in the presence of a palladium-on-charcoal catalyst. The 4,4'-diamino-N-p-tolyldiphenylamine was isolated by removing the catalyst by filtration and evaporating the solvent. The chemical melted at 145–146° C. after recrystallization from an ethanol-water mixture.

EXAMPLE 4

*4,4'-bis(2-octylamino)-N-methyldiphenylamine*

Into a 1-liter rocking autoclave were charged 33.2 grams of 4,4'-diamino-N-methyldiphenylamine, prepared as in Example 1, 200 ml. of 2-octanone and 1 gram of 5% palladium-on-carbon. The mixture while agitated was subjected to 300–500 p.s.i. gauge pressure of hydrogen at 145–150° C. for 5 hours. The catalyst was removed from the cooled mixture by filtration and the product isolated by fractional distillation under reduced pressure. The 4,4'-bis(2-octylamino)-N-methyldiphenylamine, 32 g. (47% yield), boiled at 245–246° C. (0.2 mm.).

*Analysis.*—Calculated for $C_{29}H_{47}N_3$: C, 79.6; H, 10.82; N, 9.59. Found: C, 79.2; H, 11.17; N, 9.62.

EXAMPLE 5

*4,4'-bis(methylamino)-N-methyldiphenylamine*

(A) To a suspension of 42.7 g. (0.2 mole) of 4,4'-diamino-N-methyldiphenylamine, prepared as in Example 1, in 50 g. of formamide and 15 ml. of water was added dropwise 21 ml. of concentrated sulfuric acid. The temperature rose to 100° C. and was maintained by regulating the rate of sulfuric acid addition. When all the acid was added, the mixture was heated on the steam bath for one hour. Cold water (100 ml.) was added, and the black oil that separated was decanted and dissolved in alcohol. The 4,4'-bis(formamido)-N-methyldiphenylamine crystallized upon addition of water to the mixture and was obtained in 93% yield. The product was recrystallized from alcohol; M.P. 158–161° C. The structure was confirmed by an infrared spectrum and a nitrogen analysis. Calculated for $C_{15}H_{15}N_3O_2$: N, 15.60. Found: N, 15.39.

(B) Lithium aluminum hydride (19 grams, 0.5 mole) was added in small increments to 500 ml. of ethylene glycol dimethyl ether. The mixture was heated under reflux for 2 hours. Into a modified Soxhlet apparatus was placed 29.0 g. (0.108 mole) of the 4,4'-bis(formamido)-N-methyldiphenylamine obtained in part A, and the solid was continuously extracted with refluxing ethylene glycol dimethyl ether into the lithium aluminum hydride mixture. The reaction was continued for 18 hours. At the end of this time 3 g. of material remained in the Soxhlet thimble. Ethyl acetate (35 ml.) was added to the cooled lithium aluminum hydride solution, followed by 35 ml. of water in 150 ml. of ethylene glycol dimethyl ether. The resulting precipitate was filtered and washed with solvent. The residue (24 grams) obtained after removing the solvent by distillation was chromatographed on alumina using benzene as the eluent. A tan solid 4,4'-bis(methylamino)-N-methyldiphenylamine was obtained which after recrystallization from alcohol gave the following analysis. Calculated for $C_{15}H_{19}N_3$: C, 74.7; H, 7.94; N, 17.41. Found: C, 74.8; H, 7.94; N, 17.67.

EXAMPLE 6

*4,4'-bis(cyclohexylamino)-N-methyldiphenylamine*

Into a 1.7-liter rocking autoclave were charged 90 grams of 4,4'-diamino-N-methyldiphenylamine, prepared as in Example 1, 500 ml. of cyclohexanone, and 2.95 grams of 5% palladium-on-carbon. The contents while agitated were subjected to 300–500 p.s.i. gauge pressure of hydrogen at 145° C. for ½ hour. The catalyst was removed by filtration and the solvent distilled leaving a residue product which was poured into ethanol, then diluted with water. The crude 4,4'-bis(cyclohexylamino)-N-methyldiphenylamine was obtained in 76% yield. The recrystallized product melted at 108–110° C.

*Analysis.*—Calculated for $C_{25}H_{35}N_3$: C, 79.5; H, 9.34; N, 11.13. Found: C, 79.9; H, 9.63; N, 11.11.

EXAMPLE 7

4,4'-bis(cyclohexylamino)triphenylamine

A mixture of 85 g. of 4,4'-diaminotriphenylamine, 330 ml. of cyclohexanone and 2.0 g. of 5% palladium-on-charcoal was hydrogenated under 300–500 p.s.i. gauge pressure of hydrogen for 1¾ hours at 100–130° C. and 2½ hours at 130–135° C. The catalyst was removed by filtration, and the excess cyclohexanone was removed by distillation. The glassy residue (123 g., 92%) was purified by chromatography on alumina. The 4,4'-bis(cyclohexylamino)triphenylamine was recrystallized from ethanol; M.P. 139.0–139.5° C.

*Analysis.*—Calculated for $C_{30}H_{37}N_3$: C, 82.0; H, 8.48; N, 9.56. Found: C, 82.0; H, 8.42; N, 9.43.

The 4,4'-dinitrotriphenylamine was prepared as follows: Into a 2 liter 3-neck flask equipped with a thermometer, stirrer, and a Stark and Dean trap filled with benzene, were added 121 g. of formanilide, 314 g. of p-nitrochlorobenzene, 220 g. of potassium carbonate, 115 ml. of dimethylformamide, and 5 ml. of benzene. The mixture was heated at 165–175° C. for 21 hours with continuous removal of the water formed in the reaction. The reaction mixture was cooled and quenched with 1 liter of water. The resulting precipitate was filtered and digested with dilute hydrochloric acid, then filtered and digested with hot ethanol; the hot slurry was then filtered. 242 g. (72% yield) of 4,4'-dinitrotriphenylamine was obtained, M.P. 190–195° C. The product melted at 196–1970 C. after recrystallization from glacial acetic acid (Beil. XII, 616).

The 4,4'-diaminotriphenylamine was prepared by reducing the 4,4'-dinitrotriphenylamine by hydrogenation in isopropanol at 100° C. and 200–400 p.s.i. gauge pressure of hydrogen in the presence of a palladium-on-charcoal catalyst. The 4,4'-diaminotriphenylamine was isolated by removing the catalyst by filtration and evaporating the solvent. The chemical melted at 184–186° C. after recrystallization from an ethanol-water mixture.

EXAMPLE 8

4,4'-bis(methylamino)triphenylamine (A) To a mixture of 27.5 g. of 4,4'-diaminotriphenylamine, prepared as in Example 7, 27 g. of formamide and 15 g. of water was added 10.5 ml. of concentrated sulfuric acid. The rate of addition was controlled to maintain a temperature of 100–110° C. After the addition, the mixture was heated on a steam bath for 40 minutes. Water was added to the slurry and the precipitate was filtered. The N,N'-diformyl-4,4'-diaminotriphenylamine was recrystallized from ethanol; M.P. 194–198° C.

(B) Lithium aluminum hydride (15.4 g., 0.4 mole) was added in small increments to 400 ml. of ethylene glycol dimethyl ether. The mixture was heated under reflux for 1½ hours. Into a modified Soxhlet apparatus was placed 26.5 g. (0.08 mole) of the diformyl derivative obtained in part A, and the solid was continuously extracted by heating the ether under reflux overnight. 2.5 g. of material remained in the Soxhlet thimble. Ethyl acetate (30 ml.) was added to the cooled lithium aluminum hydride solution, followed by 33 ml. of water in 150 ml. of ethylene glycol dimethyl ether. These additions were carried out under nitrogen. The resulting precipitate was filtered off and washed with the ether solvent. The filtrate was evaporated under vacuum to yield 21 g. of residue. This residue was chromatographed on alumina using benzene as the eluent. The recovered eluate was recrystallized from ethanol to obtain the 4,4'-bis(methylamino)triphenylamine, M.P. 116–118° C.

*Analysis.*—Calculated for $C_{20}H_{19}N_3$: C, 79.2; H, 6.98; N, 13.85. Found: C, 79.5; H, 7.23; N, 13.87.

The chemicals of the present invention are antiozonants for rubbers, such as natural rubber and synthetic rubbers, and mixtures thereof. The synthetic rubbers may be the products of aqueous emulsion polymerizations with a peroxide catalyst of various rubber-forming monomers. Such synthetic rubbers may be polymers of butadienes-1,3, e.g. butadiene-1,3, 2-methylbutadiene-1,3 (isoprene), 2-chlorobutadiene-1,3 (chloroprene), 2,3-dimethylbutadiene-1,3, piperylene, and copolymers of mixtures thereof, and copolymers of mixtures of one or more such butadienes-1,3 with up to 70% of such mixtures of one or more monoethylenic compounds which contain a

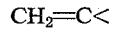

group where at least one of the disconnected valences is attached to an electro-negative group, that is a group which substantially increases the electrical dissymmetry or polar character of the molecule. Examples of such monoethylenic compounds which are copolymerizable with butadienes-1,3, are aryl olefins, such as styrene, vinyl naphthalene, alpha methyl styrene, para chloro styrene, dichloro styrene, alpha methyl dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridines, such as 2-vinyl pyridine, 2-methyl-5-vinyl pyridine; vinyl carbazole. Commercial synthetic rubbers of this type are SBR (copolymer of a major proportion of butadiene and a minor proportion of styrene) and NBR (copolymer of a major proportion of butadiene and a minor proportion of acrylonitrile). The synthetic rubber may also be a 1,4-polybutadiene or a 1,4-polyisoprene, prepared by solution polymerization. Such 1,4-polybutadiene may be made by solution polymerization of butadiene-1,3 in the presence of a catalyst reaction product of an aluminum trialkyl, such as aluminum triethyl, and titanium iodide. Such 1,4-polyisoprene may be made by solution polymerization of isoprene in the presence of a catalyst reaction product of an aluminum trialkyl, such as aluminum triisobutyl, and titanium tetrachloride. The synthetic rubber may also be the product of the solution polymerization of a mixture of a major proportion of isoolefin and a minor proportion of conjugated diene at low temperature in the presence of a Friedel-Crafts polymerization catalyst of the type of aluminum chloride or boron trifluoride. An example of a commercial synthetic rubber of this type is butyl rubber which is a copolymer of about 95 to 99 parts of isobutylene and correspondingly 5 to 1 parts of isoprene. The synthetic rubber may also be the product of the solution polymerization of a mixture of ethylene and at least one alpha olefin having the formula $CH_2=CHR$ in which R is an alkyl radical having 1 to 8 carbon atoms, e.g. propylene, with, if desired, a minor proportion of a non-conjugated diene, such as 1,4-hexadiene or dicyclopentadiene, in the presence of a catalyst reaction product of aluminum trialkyl, and titanium tetrahalide or vanadium tetrahalide or vanadium oxytrihalide, e.g. the reaction product of aluminum tridecyl and vanadium oxytrichloride. An example of a synthetic rubber of this type is a terpolymer of about 55% propylene, 41% ethylene and 4% 1,4-hexadiene.

The new antiozonants may be used in combination with waxes and other antiozonants. They may be used in rubber stocks with the usual compounding ingredients, e.g. vulcanizing agents, accelerators, activators, retarders, antioxidants, softeners, and reinforcing agents.

Examples 9 to 12 illustrate the effectiveness of the chemicals of the present invention as antiozonants and antioxidants for rubber.

EXAMPLE 9

Compounds of the present invention were evaluated for their antiozone activity in a modification of the test of A. D. Delman, B. B. Simms and A. R. Allison as described in Analytical Chemistry, vol. 26, 1589 (1954). In this test the ability of the compounds to retard the scission of rubber molecules in solution by ozone is determined by measuring the percent of initial viscosity of the polymer solution retained after successive periods of subjection to a regulated stream of ozone of constant concentration. It has been well demonstrated that there is a correlation between the results of this test and actual rubber tests, taking into account such factors as the reactivity of the test compound with the other rubber compounding ingredients, loss by volatility, rates of migration of the chemical, etc. In the modification of the test by which the compounds of this invention were evaluated, a solution of 1.25 grams of SBR (copolymer of about 77 parts by weight of butadiene and 23 parts by weight of styrene) previously extracted with a mixture of ethanol-toluene-water in the ratio 50:40:10, and 0.125 gram of test compound in 250 ml. of o-dichlorobenzene was ozonized at room temperature with a stream of air containing 250 p.p.m. of ozone by volume at a rate of 0.02 cubic meter per hour. The measurements of the viscosity of the solutions at 30° C. were made before the start of the ozonization and after each hour for six hours, and from these data the percent of initial viscosity retained after each hour was calculated. The results are given in the following table.

| Chemical | Percent Initial Viscosity Retained after— | | | | | |
|---|---|---|---|---|---|---|
| | 1 hr. | 2 hr. | 3 hr. | 4 hr. | 5 hr. | 6 hr. |
| None | 36.2 | 16.8 | | | | |
| 4,4'-bis(methylamino)-N-methyldiphenylamine | 96.9 | 92.9 | 85.3 | 72.1 | 52.3 | 29.4 |
| 4,4'-bis(isopropylamino)-N-methyldiphenylamine | 96.8 | 94.1 | 86.6 | 78.6 | 63.1 | 39.0 |
| 4,4'-bis(sec.-butylamino)-N-methyldiphenylamine | 95.8 | 87.4 | 76.3 | 57.4 | 35.8 | 18.4 |
| 4,4'-bis(1,3-dimethylbutylamino)-N-methyldiphenylamine | 94.0 | 86.5 | 72.0 | 52.0 | 29.0 | 16.0 |
| 4,4'-bis(cyclohexylamino)-N-methyldiphenylamine | 95.5 | 87.4 | 73.9 | 50.2 | 29.7 | 17.6 |
| 4,4'-bis(2-octylamino)-N-methyldiphenylamine | 96.8 | 91.9 | 82.3 | 66.7 | 37.1 | 17.2 |
| 4,4'-bis(isopropylamino)-N-ethyldiphenylamine | 94.3 | 82.8 | 61.9 | 32.8 | 17.2 | |
| 4,4'-bis(methylamino)triphenylamine | 93.8 | 85.6 | 73.8 | 56.9 | 37.9 | 20.5 |
| 4,4'-bis(isopropylamino)triphenylamine | 91.4 | 78.6 | 64.2 | 42.2 | 24.1 | 11.8 |
| 4,4'-bis(cyclohexylamino)triphenylamine | 88.5 | 75.5 | 57.2 | 38.0 | 20.8 | |
| 4,4'-bis(2-octylamino)triphenylamine | 87.1 | 69.6 | 49.7 | 30.8 | 16.9 | |
| 4,4'-bis(isopropylamino)-N-p-tolyldiphenylamine | 91.0 | 81.5 | 67.5 | 49.0 | 29.0 | 15.5 |

These data show the high antiozone activity of the chemicals of the present invention.

EXAMPLE 10

The ability of the chemicals of the present invention to retard the formation of ozone cracks in cured rubber was determined in the following recipe for the rubber stocks:

Parts by weight
SBR 1500 (copolymer of about 77 parts by weight of butadiene and 23 parts by weight of styrene) _____ 100.0
Zinc oxide _____ 3.0
HAF carbon black _____ 40.0
EPC carbon black _____ 10.0
Stearic acid _____ 1.5
Saturated polymerized petroleum hydrocarbon plasticizer (Para-Flux 2016) _____ 3.5
Naphthenic type oil (Circo light process oil) _____ 3.5
N-cyclohexyl-2-benzothiazolesulfenamide _____ 1.25
Sulfur _____ 2.0
Antiozone test chemical _____ 2.0

Looped test specimens of the stocks cured for 45 minutes at 292° F. were prepared according to Procedure B (Exposure of Looped Specimens) of ASTM Method D518–57T (Resistance to Surface Cracking of Stretched Rubber Compounds). Specimens were subjected to outdoor exposure on a roof at an angle of 45 degrees facing south. The specimens were observed after appropriate intervals on the roof, and the time recorded to the appearance of cracks corresponding to those having a rating number of 3 in ASTM Method D1171–59 (Test for Weather Resistance Exposure of Automotive Rubber Compounds). The days required to crack to a rating number of 3 are given in the following table:

Chemical: Days
None _____ 4
4,4'-bis(isopropylamino)-N-methyldiphenylamine _____ 153
4,4'-bis(cyclohexylamino)-N-methyldiphenylamine _____ 241
4,4'-bis(sec.-butylamino)-N-methyldiphenylamine _____ 205
4,4'-bis(1,3-dimethylbutylamino)-N-methyldiphenylamine _____ >278
4,4'-bis(2-octylamino)-N-methyldiphenylamine _____ >278

EXAMPLE 11

In a dynamic flexing test, molded stocks of the recipe of Example 10, ½" x 6" x ¼" having a ⅛" radius circular groove across the center were cured for 45 minutes at 292° F. They were mounted outdoors facing south and flexed through a 78 degree angle at about 8.5 kilocycles per hour. Observations were made after appropriate intervals and the number of kilocycles recorded to the appearance of cracks corresponding to those having a rating number of 3 in ASTM Method D1171–59. Both unaged stocks and stocks which had been heat aged at 158° F. for 7 days were tested. The number of kilocycles required to crack to a rating number of 3 are given in the following table:

| Chemical | Kilocycles to Crack | |
|---|---|---|
| | Unaged | Aged 7 days/158° F. |
| 4,4'-bis(isopropylamino)-N-methyldiphenylamine | 16,442 | 7,084 |
| 4,4'-bis(cyclohexylamino)-N-methyldiphenylamine | 14,882 | 6,143 |
| 4,4'-bis(sec.-butylamino)-N-methyldiphenylamine | 14,882 | 6,143 |
| 4,4'-bis(1,3-dimethylbutylamino)-N-methyldiphenylamine | 14,882 | 6,143 |
| 4,4'-bis(2-octylamino)-N-methyldiphenylamine | 16,442 | 6,143 |
| 4,4'-bis(isopropylamino)triphenylamine | 17,293 | 15,698 |
| 4,4'-bis(cyclohexylamino)triphenylamine | 4,571 | 8,076 |
| 4,4'-bis(isopropylamino)-N-p-tolyldiphenylamine | 9,704 | 14,848 |
| 4,4'-bis(2-octylamino)triphenylamine | 4,571 | 8,076 |
| None | 1,720 | 3,730 |

EXAMPLE 12

The ability of the chemicals of the present invention to inhibit the oxidation of natural rubber was determined in the following recipe:

Smoked sheets _____ 100.0
Zinc oxide _____ 5.0
ISAF carbon black _____ 45.0
Pine tar _____ 4.5
Stearic acid _____ 4.5
N-cyclohexyl-2-benzothiazolesulfenamide _____ 0.5
Sulfur _____ 2.5
Antioxidant test chemical _____ 2.0

The rubber stocks were cured for 60 minutes at 292° F. The retention of tensile strength after aging in oxygen for 96 hours at 70° C. demonstrates the effectiveness of these chemicals as antioxidants. The results are shown in the following table:

| Chemical | Tensile Strength | | |
|---|---|---|---|
| | (Lbs./sq. in.) | | Percent Retained |
| | Unaged | Aged | |
| 4,4'-bis(isopropylamino)-N-methyl-diphenylamine | 4,170 | 2,800 | 67 |
| 4,4'-bis(cyclohexylamino)-N-methyl-diphenylamine | 3,790 | 2,630 | 69 |
| 4,4'-bis(sec.-butylamino)-N-methyl-diphenylamine | 4,080 | 2,860 | 70 |
| 4,4'-bis(1,3-dimethylbutyl)-N-methyl-diphenylamine | 3,960 | 2,820 | 71 |
| 4,4'-bis(2-octylamino)-N-methyl-diphenylamine | 4,010 | 2,780 | 69 |
| 4,4'-bis(isopropylamino)-triphenylamine | 3,900 | 2,970 | 76 |
| 4,4'-bis(cyclohexylamino)-triphenylamine | 3,700 | 3,120 | 84 |
| 4,4'-bis(2-octylamino)-triphenylamine | 3,910 | 3,160 | 81 |
| 4,4'-bis(isopropylamino)-N-p-tolyl-diphenylamine | 3,960 | 3,130 | 79 |
| None | 4,160 | 800 | 19 |

It may be seen from the above table that the chemicals of the present invention are also antioxidants for rubber.

In view of the many changes and modifications that may be made without departing from the principles underlying the invention, reference should be made to the appended claims for an understanding of the scope of the protection afforded the invention.

Having thus described my invention what I claim and desire to protect by Letters Patent is:

1. A compound of the formula

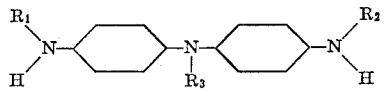

in which $R_1$ and $R_2$ are the same and are selected from the group consisting of alkyl radicals having 1 to 8 carbon atoms and cycloalkyl radicals having 5 to 8 carbon atoms, and $R_3$ is selected from the group consisting of alkyl radicals having 1 to 4 carbon atoms and phenyl and alkyl monosubstituted phenyl radicals in which the alkyl substituent has 1 to 4 carbon atoms.

2. A 4,4'-bis(alkylamino)-N-methyldiphenylamine in which the alkyl groups have 1 to 8 carbon atoms.

3. A 4,4'-bis(alkylamino)triphenylamine in which the alkyl groups have 1 to 8 carbon atoms.

References Cited by the Examiner

UNITED STATES PATENTS

| 2,022,889 | 12/1935 | Lauer | 260—576 |
| 2,225,368 | 12/1940 | Craig | 260—576 |
| 2,494,059 | 1/1950 | Ruggles | 260—576 |
| 2,934,517 | 4/1960 | Young | 260—45.9 |
| 2,960,488 | 11/1960 | Tamblyn et al. | 260—45.9 |

OTHER REFERENCES

Madelung et al., Justus Liebigs Annalen der Chemie, 1927, vol. 454, pp. 7–37.

Neunhoeffer et al., "Berichte," vol. 92, pages 248 and 250 (1959).

Pachter et al., "Jour. Amer. Chem. Soc.," vol. 74, pages 1321–2 (1952).

CHARLES B. PARKER, *Primary Examiner.*

DALE R. MAHANAND, ROBERT V. HINES,
*Assistant Examiners.*